United States Patent
Spradlin (10) Patent No.: US 10,887,316 B2
(45) Date of Patent: Jan. 5, 2021

(54) SOFTWARE DEFINED NETWORK FOR CREATING A TRUSTED NETWORK SYSTEM

(71) Applicant: CleverDome, Inc., Gilbert, AZ (US)

(72) Inventor: Aaron Spradlin, Gilbert, AZ (US)

(73) Assignee: Cleverdome, Inc., Gilbert, AZ (US)

( * ) Notice: Subject to any disclaimer, the term of this patent is extended or adjusted under 35 U.S.C. 154(b) by 148 days.

(21) Appl. No.: 16/172,779

(22) Filed: Oct. 27, 2018

(65) Prior Publication Data

US 2019/0132326 A1 May 2, 2019

Related U.S. Application Data

(60) Provisional application No. 62/578,300, filed on Oct. 27, 2017.

(51) Int. Cl.
*G06F 7/04* (2006.01)
*H04L 29/06* (2006.01)
(Continued)

(52) U.S. Cl.
CPC .......... *H04L 63/102* (2013.01); *H04L 41/20* (2013.01); *H04L 45/64* (2013.01);
(Continued)

(58) Field of Classification Search
CPC ....... H04L 63/08; H04L 63/102; H04L 63/20; H04L 63/0209; H04L 63/10; H04L 63/18; H04L 2463/082; H04L 41/20
(Continued)

(56) References Cited

U.S. PATENT DOCUMENTS

| | | | | |
|---|---|---|---|---|
| 6,826,698 | B1 * | 11/2004 | Minkin | ............... H04L 63/0263 709/223 |
| 7,249,374 | B1 * | 7/2007 | Lear | ........................ G06F 21/31 709/203 |

(Continued)

FOREIGN PATENT DOCUMENTS

WO 2017079359 A1 5/2017

OTHER PUBLICATIONS

UCF/STIG Viewer, The Application Must Authenticate All Network Connected Endpoint Devices Before Establishing Any Connection, https://www.stigviewer.com/stig/application_security_and_development/2017-03-20/finding/V-69549, Mar. 20, 2017, 2 pages.
(Continued)

*Primary Examiner* — Samson B Lemma
(74) *Attorney, Agent, or Firm* — Adam R. Stephenson, Ltd.

(57) ABSTRACT

Implementations of a software-defined network perimeter system may include: a security standards server configured to send an installer to a first client machine utilizing an endpoint protection server, a console server configured to route data across a dispersive network where the data is routed between the first client machine and second client machine, a controller configured to electronically couple the first and second client machines to network resources, a first and second endpoint device coupled to the first and second client machines, respectively, and a correlation server coupled to the security standards server, the console server, the controller, and the first and second endpoint devices where the correlation server is configured to match a physical or logical aspect of the client machine to a registration key included in a database of registration keys where the respective endpoint device provides access to the network resources after receiving the registration key.

15 Claims, 8 Drawing Sheets

(51) Int. Cl.
*H04L 12/24* (2006.01)
*H04L 12/715* (2013.01)

(52) U.S. Cl.
CPC .......... *H04L 63/0209* (2013.01); *H04L 63/08* (2013.01); *H04L 63/20* (2013.01); *H04L 65/1073* (2013.01); *H04L 63/10* (2013.01); *H04L 63/18* (2013.01); *H04L 2463/082* (2013.01)

(58) Field of Classification Search
USPC .......................................................... 726/4
See application file for complete search history.

(56) References Cited

U.S. PATENT DOCUMENTS

| | | |
|---|---|---|
| 7,895,348 B2 | 2/2011 | Twitchell, Jr. |
| 7,987,211 B2 | 7/2011 | Johnson et al. |
| 8,955,110 B1 | 2/2015 | Twitchell, Jr. |
| 9,038,151 B1 | 5/2015 | Chua et al. |
| 9,088,891 B2 | 7/2015 | Belton et al. |
| 9,325,719 B2 | 4/2016 | Lloyd |
| 9,495,194 B1 | 11/2016 | Twitchell, Jr. et al. |
| 9,544,287 B1 | 1/2017 | Sokolov et al. |
| 9,769,172 B2 | 9/2017 | Hunukumbure et al. |
| 2004/0186996 A1* | 9/2004 | Gibbs .................. H04L 63/123 713/168 |
| 2006/0072583 A1* | 4/2006 | Sanda ................ H04L 63/0227 370/395.53 |
| 2006/0123465 A1 | 6/2006 | Ziegler |
| 2009/0049196 A1* | 2/2009 | Smith .................. H04L 63/083 709/245 |
| 2015/0113589 A1* | 4/2015 | Lemaster ............ H04L 63/0281 726/1 |
| 2016/0128043 A1* | 5/2016 | Shuman .............. H04W 72/044 370/331 |
| 2017/0214692 A1 | 7/2017 | Bathija et al. |
| 2017/0230350 A1 | 8/2017 | Enrique Salpico |

OTHER PUBLICATIONS

International Search Report and Written Opinion, PCT Patent Application No. PCT/US2018/057889, dated Jan. 16, 2019, 8 pages.

\* cited by examiner

SOFTWARE DEFINED NETWORK FOR CREATING A TRUSTED NETWORK SYSTEM

CROSS REFERENCE TO RELATED APPLICATIONS

This document claims the benefit of the filing date of U.S. Provisional Patent Application 62/578,300, entitled "Software Defined Network for Creating a Trusted Network System," to Spradlin, which was filed on Oct. 27, 2017, the disclosure of which is hereby incorporated entirely herein by reference.

BACKGROUND

1. Technical Field

Aspects of this document relate generally to computer networking systems.

2. Background

Computer networks operate by connecting computing devices to each other using static routing technology. In static routing, the path through the network is defined at the beginning of a communication sequence between the source and destination computers, and remains the same for the duration of the communication. Various computer security techniques are employed to ensure that the source and destination computers can be trusted, such as secure socket layer (SSL), https, and other encryption protocols.

SUMMARY

Implementations of a software-defined network perimeter system may include: a security standards server configured to send an installer to a first client machine utilizing an endpoint protection server, a console server configured to route data across a dispersive network where the data is routed between the first client machine and a second client machine, a controller configured to electronically couple the first and second client machines to network resources, a first and second endpoint device coupled to the first and second client machines, respectively, and a correlation server coupled to the security standards server, the console server, the controller, and the first and second endpoint devices where the correlation server is configured to match a physical or logical aspect of the client machine to a registration key included in a database of registration keys where the respective endpoint device provides access to the network resources after receiving the registration key.

Implementations of a software-defined network perimeter system may include one, all, or any of the following:

The dispersive network may be configured to couple to a third client machine where an endpoint device is configured to deny access to the third client machine from the first client machine in response to the correlation server indicating that the third client machine is not a permitted network resource for the third client machine.

The correlation server may be configured to synchronize network resource access permissions with the console server.

The first endpoint device and second endpoint device may be secured according to a set of predefined security standards.

The correlation server, the first endpoint device, and the second endpoint device may be further configured to utilize two-factor authentication.

The first registration key and the second registration key may be transmitted by electronic mail, respectively, to a user of the first client machine and to a user of the second client machine.

The first registration key and the second registration key may be transmitted by simple message service, respectively, to a user of the first client machine and to a user of the second client machine.

Implementations of a software-defined network perimeter system may also include: a number of secure endpoint devices where each secure endpoint device has been vetted according to a set of predefined security standards. A console server may be coupled with each of the secure endpoint devices where the console server is configured to route data across a dispersive network between each of the secure endpoint devices. A correlation server may be coupled with the console server where the correlation server is configured to determine which one of the secure endpoint devices receives data from each one of the other secure endpoint devices across the dispersive network.

Implementation of a software-defined network perimeter system may also include one, all, or any of the following:

A security standards server may be coupled with the correlation server and configured to send an installer to an endpoint device utilizing an endpoint protection server where the first endpoint device is configured to transmit the installer to a first client device.

A controller may be coupled with the correlation server and configured to electronically couple a first secure endpoint device and a second secure endpoint device from among the plurality of secure endpoint devices with a plurality of network resources.

Each of the plurality of secure endpoint devices may be coupled to each of a plurality of client machines, respectively, and each of the plurality of secure endpoint devices may be configured to provide access to a plurality of network resources to a respective client machine of the plurality of client machines in response to receiving a registration key from the correlation server.

The plurality of predefined security standards may include an encryption standard.

The plurality of predefined security standards may include a plurality of device vulnerability tests.

The plurality of predefined security standards may include a security auditing standard.

The console server may further be configured to divide data transmitted over a network into a plurality of component transmissions, where each of the plurality of component transmissions is transmitted over independent paths over the dispersive network.

The console server may be further configured to randomize a plurality of data transmission paths over the dispersive network.

Implementations of a software-defined network perimeter system may also utilize a method using a software-defined network perimeter system to establish a trusted network. Implementations of the method may include: vetting a first client machine according to a set of predefined security standards, onboarding the first client machine to the trusted network through an endpoint device coupled to the first client machine after the first client machine has met the requirements of the predefined security standards, and permitting the first client machine to electronically communicate with a second client machine across a dispersive network using a correlation server where the second client machine has been vetted according to the set of predefined security standards and has been indicated by the correlation server as allowed to communicate with the first client machine.

Implementation of a a method using a software-defined network perimeter system to establish a trusted network may include one, all, or any of the following methods:

The method may further include dispersing network traffic across the dispersive network using a console server.

The method may further include sending at least one physical aspect or at least one logical aspect of the first client machine with a registration key using a database of registration keys. The method may also include transmitting the matched registration key from the correlation server to the endpoint device.

The method may further include installing one or more executable files on the first client machine using an endpoint server.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended software defined network for creating a trusted network system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such software defined network for creating a trusted network system, and implementing components and methods, consistent with the intended operation and methods.

In static routed telecommunication systems, the public networks used for transmission are open to all persons who have access to them, and those persons can observe the traffic on the network. If the network is the internet, then most individuals around the world could potentially intercept the packets being transmitted by a source, and even if they were unable to decrypt them, they could find out the destination of the packets using the static nature of the route. In this way, such individuals can at least figure out relationships between who controls the source computer and who controls the destination computer for a transmission. With this information, they can use other methods (phishing, spear phishing, zero day faults, etc.) to compromise either the source or destination computer to allow them access to the data being transferred. Because the individual or company who controls the source computer may have different network security standards than the individual or company who controls the destination computer, the differences may make it easier for a hacker or other individual to compromise the privacy of the data being exchanged, even if the standards of one party may be administered to high standards. Finally, in static routing, it is the cryptographic strength of the ciphers being used to encrypt the data that prevents the decryption of the data. Once the ciphers are compromised, all data transmitted over a static route using those ciphers can be decrypted. This can happen as the data on the static route can be intercepted, and then later, when the ciphers are compromised, decrypted.

System and method implementations disclosed herein allow for due diligence vetting of a client device, and then onboarding that device to a trusted network. The client device is then permitted to access network resources, such as other client devices onboarded to the same trusted network. Implementations of trusted networks disclosed herein are configured to facilitate communication between network resources in a dispersive pattern, though the described system may use a public network to send the data transmitted by the system.

Implementations of systems and methods for using a software defined network to establish a trusted network for use by third-party vetted users are disclosed in this document. The system and method implementations disclosed herein may use any of the system and method implementations disclosed in the following references, the disclosures of each of which are hereby incorporated entirely herein by reference: U.S. Pat. No. 9,325,719 to Michael Lloyd, entitled "Method and System for Evaluating Access Granted to Users Moving Dynamically Across Endpoints in a Network," issued Apr. 26, 2106; U.S. Patent Application Pub. No. 20170230350 to Jose Antonio Enrique Salpico, entitled "Network Element and Method for Improved User Authentication in Communication Networks," published Aug. 10, 2017; U.S. Pat. No. 9,088,891 to Belton et al., entitled "Wireless Multifactor Authentication with Captive Portals," issued Jul. 21, 2015; U.S. Patent Application Pub. No. 20170214692 to Bathija et al., entitled "Relayed Network Access Control Systems and Methods," published Jul. 27, 2017; U.S. Patent Application Pub. No. 20060123456 to Robert Ziegler, entitled "Method and System of Authentication of an Open Network," published Jun. 8, 2006; U.S. Pat. No. 9,769,172 to Hunukumbure et al., entitled "Method of Accessing a Network Securing from a Personal Device, a Personal Device, a Network Server and an Access Point," issued Sep. 19, 2017; U.S. Pat. No. 9,544,287 to Sokolov et al., entitled "Systems and Methods for Performing Authentication at a Network Device," issued Jan. 10, 2017; and U.S. Pat. No. 9,038,151 to Chua et al., entitled "Authentication for Software Defined Networks," issued May 19, 2015.

Three major aspects of the system and method implementations disclosed herein will be discussed in turn in this document. Various system and method implementations may include one, all, or any of these aspects.

Secure Endpoint Devices

In various system and method implementations, the users of the system have one or more computing devices associated with them. The users may be individuals and/or institutions like companies or governmental agencies in various implementations. The computing devices may be, by non-limiting example, a desktop computer, a laptop computer, a tablet, a smartphone, a cellular telephone, a smart watch, a server, a database, or any other device capable of transmitting or receiving data across a telecommunication channel. In various system implementations, a first user may seek to connect with a second user across a private network of the system. The reason for the communication may be, by non-limiting example, sending messages (email, text messages, chat messages, etc.), transmitting data (retrieving and storing information to and from a database, web server, electronic data exchange, etc.), and/or transmitting voice and/or video data (telephony, voice over IP, video conferencing, etc.) over the system or any other data transfer across a telecommunication channel. Users of the system may be from a wide variety of industries including, by non-limiting example, financial services, legal, medical, engineering, banking, military, government, entertainment, internet, sales and marketing, and any other industry using the exchange of data. The users may also be individuals who are seeking to access and exchange information with various service providers in any of the industries disclosed herein.

The computing devices of the users of the system access the private network through/using a secure endpoint device. In various implementations, the secure endpoint device may be a physically separate device from the computing devices associated with the user (which may be any device disclosed in any of the references incorporated by reference herein). In other implementations, the secure endpoint device may be the computing devices themselves or in the computing devices themselves. In these implementations, a software application is installed on the computing devices that controls the operation of the device in such a way that certain predefined computing security standards are present and/or observed by the user when using the device. These may be, by non-limiting example, password use, password length, password characters, network configuration, operating system versions, types of other installed applications, existence of virus software, status of firewall software, and any other desired cybersecurity measure or function associated with a computing device. In particular implementations, the software application may operate as stand-alone code, and all of the predefined computing security standards may be installed with the code at runtime. In other implementations, the software application may operate in communication with a computer networking system that houses the current predetermined computing security standards in a software-as-a-service (SAAS) configuration.

As a non-limiting example of such predefined computing security standards, the standards may include determining the following about a client device, or any other endpoint device: determining if full disk encryption is used, determining if wireless connections are encrypted, determining if passwords on the device are strong or secure, determining if the passwords on the device are configured to expire after a certain period of time, determining if the device is protected by a firewall, determining if the device is utilizing anti-virus software, determining if the anti-virus software is configured to update on the device automatically, determining if the operating system on the device is configured to update automatically, determining if the device is equipped with a screen lock feature which will lock or shut off the device's screen or user interface after a period of inactivity, determining if the device has any peer-to-peer software (P2P) installed, determining if data leakage is monitored on the device, determining if there is a process in place for regular system maintenance on the device or any of its constituent components such as the installation of software patches, determining what applications or programs may be installed on the device and keeping an inventory of the same, monitoring the presence of any unauthorized users, devices, or connections on the network, and performing security tests such as penetration testing, monitoring, and scanning. The aforementioned examples of due diligence vetting can be implemented on any type of computing device, including mobile devices.

The use of the secure endpoint devices (whether physically separate devices or the combination of the software application and computing devices themselves) means that no computing device can access the private network without meeting the predefined computing security standards. This in itself serves to reduce risks of compromised devices being allowed to access and send requests over the private network. Because the use of the software application automates and compels user compliance with the standards, human factors related to cybersecurity breaches are mitigated, and more limited to issues surrounding zero day faults and other previously unknown or not yet patched problems with applications, operating systems, telecommunication protocols, or networking protocols and/or systems.

Private Network

The private network used in system implementations is designed to employ dispersive or quantum routing of the data being transmitted from a first user of the system to a second user of the system. The concept of dispersive routing refers to the system using multiple network paths to transmit the data from the first user to the second user where those network paths dynamically change during the transmission. In this way, even if one or more packets are intercepted or otherwise observed by a hacker or other entity, the ultimate destination of the data cannot be determined from the intercepted packets. This prevents hackers from learning about users simply by observing the movement of the packets on the network.

A wide variety of systems and methods may be employed to construct the private network. These include any of the systems and methods disclosed in the following references, the disclosures of each of which are hereby incorporated entirely herein by reference: World Intellectual Property Office Pub. No. WO2017079359 to Robert Twitchell Jr., entitled "Virtual Dispersive Networking Systems and Methods," published May 11, 2017; U.S. Pat. No. 9,495,194 to Twitchell Jr., et al, entitled "Dispersive Storage Area Networks," issued Nov. 15, 2016; U.S. Pat. No. 8,955,110 to Twitchell Jr., entitled "IP Jamming Systems Utilizing Virtual Dispersive Networking," issued Feb. 10, 2015; U.S. Pat. No.

7,987,211 to Johnson et al., entitled "System and Method for Automated Deployment of an Information Handling System," issued Jul. 26, 2011; and U.S. Pat. No. 7,895,348 to Twitchell Jr., entitled "Virtual Dispersive Routing," issued Feb. 22, 2011.

Additional systems and methods that may be implemented to construct the private network may employ a dispersive networking system, also called a dispersive virtualized network; i.e., that the data can be routed across the fastest calculated dispersed paths, thereby improving overall system bandwidth and performance while simultaneously eliminating the ability for a network intruder to determine relationships between endpoints on the network that are communicating with each other. A communication system may, by non-limiting example, be considered secure if it meets the following requirements: authentication, integrity, confidentiality, availability, and non-repudiation. Authentication may, by non-limiting example, refer to a first network device being able to verify that a second network device is in fact what it reports to be, and is not an imposter. In this way, each network device can ensure that messages or communication are coming from the intended sender, and are arriving at the intended recipient. Integrity may, by non-limiting example, refer to a first network device being able to be sure that a message or other network communication arrives at its destination without being altered or tampered with. Confidentiality may, by non-limiting example, refer to a first network device being able to send a message or other network communication to a second network device without that communication being intercepted, or without eavesdropping. Availability may, by non-limiting example, refer to network devices being able to communicate with each other without interruption or disruption from any unauthorized third party. Finally, non-repudiation may, by non-limiting example, refer to a network device not being able to deny that it sent a message or network communication if the device did, in fact, send such communication. A dispersive network may implement each of the aforementioned requirements for a secure communication system. A dispersive network may, by non-limiting example, implement a virtual network that can overlay the internet. This network, by non-limiting example, may split or section network communication packets into multiple, individual, and non-duplicated packet streams. The individual packet streams may then disperse over dynamic and different routes across the network. Each network path may, by non-limiting example, use encryption. Each network path may, by non-limiting example, change during a single session. This type of dispersion may, by non-limiting example, prevent such network intrusion as man-in-the-middle attacks.

Furthermore, each endpoint device on the network may be authenticated using a system of 2-factor, or multi-factor, authentication. As each device is onboarded to the network, it may only be allowed access to the network resources for which access is required and authorized. If a network device requests or needs access to new or different network resources, the device may be required to pass through, or be subject to, the same or similar predefined security standards, tests, due diligence, or vetting process, before being authorized to access those new or different network resources. A dispersive network may, by non-limiting example, also employ the use of deflects or deflective waypoints, which obscure source and destination information for network traffic. An endpoint device of a dispersive network may not accept any direct connection from another endpoint device or network resource, which further obscures network traffic information.

In various implementations, the private network is formed and defined using software and can be referred to as a "software defined perimeter," (SDP). In this way the physical wiring or wireless telecommunication channels that the private network uses is actually the public internet and/or other networking equipment available for use by the public. While in some implementations, the private network could be formed using dedicated hardware and dedicated long distance communication channels, the use of the SDP version of the network in a dispersive way permits the data to be sent over the public network system without loss of privacy and without substantial risk of interception and/or reconstruction by a hacker or other individual. This ability to use the public internet and telecommunications infrastructure without having to use virtual private networking (VPN) and other static routing techniques that involve encryption and decryption of data may lead to data transfer rates 10 times faster than can be obtained over conventional VPN technologies.

In various implementations of the network, subdomain addressing (vtn.company.xxx) may be employed in order to indicate to users that the data transfers are occurring across the private network rather than the open internet.

In various implementations of the network, a correlation server executes a supervisory function on the private network, but does not need to participate in the actual ongoing individual routing of the data across the private network. It works to initially validate computing devices and then identify which network resources the computing devices can access on the network. Then the console CSR server and/or the controller handle all subsequent traffic between the User/Client computing device and the allowed computing devices.

If the User/Client computing device is subsequently to be permitted to access new or different resources on the private network, the correlation server handles the requesting process and the provisioning process for the User/Client computing device. The correlation server then communicates the change(s) in the network resources and the User/Client computing device to the console CSR server and/or the controller, which then manage the network traffic.

In private network implementations like those disclosed herein, no individual User/Client computing device connected to the network has the ability to transfer data to any other User/Client computing device on the network other than the ones the correlation server has provisioned it to communicate with. Furthermore, because the actual data transfer is handled dispersively, no individual User/Client computing device actually can directly connect with any other User/Client computing device across the network (as would occur if the network used static routing). Put differently, each User/Client computing device transmits data into the private network without knowing exactly where the data will be received and without the ability to communicate directly with any other computing devices except through the dispersive protocol of the private network. Because the data itself during transmission between the computing devices is handled dispersively, if the data is intercepted during transmission, it is impossible for the interceptor to obtain all the data, including the identity of the sending computing device or the identity of the receiving computing device. In this way, the private network may function as a type of "dark net" where none of the computing devices can know the identity of the devices they are connecting to and the internal network does not provide tracking information on the data packets that would permit an eavesdropper to reconstruct the data being transmitted or its source or destination. However, unlike dark nets like the Tor Project, implementations of private networks like those disclosed herein include the correlation server which has the master list of which computing devices are provisioned to communicate with each other across the network. Accordingly, if authorities need to verify the identity of a device and minimal information about dates and times of communication between devices (but not the actual data itself), information can be provided about which computing device is 1) associated with which user on the network and 2) which other computing devices it can communicate with, in various implementations. Further information regarding this function will be discussed in the next section.

Third-Party Due Diligence

One of the principal challenges of attempting to maintain data privacy and security using static routing connections over a public network is that the network is just that: public. Anyone with an internet connection anywhere in the world can access the network for any purpose. If anyone was also allowed to connect to the private network implementation disclosed herein, the same problems would exist. Accordingly, the third aspect of the system and method implementations disclosed herein is the use of an independent third party separate from the users who wish to access and use the private network. In various implementations, this third party may, by non-limiting example, perform due diligence on the users.

As disclosed herein, due diligence includes all forms of identity verification, network configuration verification, computer security verification, criminal verification, background verification, credit history verification, business identity verification and so forth. Those users who wish to have access to the private network must establish to the third party's satisfaction after due diligence that they are who they say they are and that their systems meet the predefined security standards to prevent their computing systems from being compromised while they are connected to the private network. In this way, since all users of the system are vetted to the same set of third party standards, they all can have confidence that every other party they interact with on the private network is following those same standards. The use of third party due diligence eliminates much (in some cases all) of the need for each user of the system to independently perform due diligence on the parties it will interact with on the private network. Also, because the network is private, established by software, and access controlled by the third party doing the due diligence through the correlation server, the ability of any hackers or other individuals to get access to the computing devices and the data being transferred is made extremely difficult. Even if a hacker or other individual was able to compromise a computing device attached to the network, since the data is transferred dispersively across the network, that computing device would not allow the hacker to locate or attack any other computing device on the network, even the ones which the compromised computing device was provisioned to communicate with. Furthermore, the use of secure endpoint devices further complicates the hacker's task, as they must first be able to penetrate a device that already is automatically operating according to predefined computing security standards.

Accordingly, the fact that, before any computing device associated with any potential client can access the network and access any other computing device on the network, that potential client must pass the due diligence process is the aspect of the system that enables the private network and secure endpoint devices to, as a practical matter, ensure the privacy and security of the data involved. In this way, the due diligence process improves the functioning of the private network itself, the computing systems, and the secure endpoint devices. This aspect ensures the "quality" or "trustworthiness" of the actual users who are in possession of the devices and who seek to use the network. It also ensures the "quality" or "trustworthiness" of the actual data itself transmitted among the users associated with the devices.

A wide variety of due diligence processes may be employed by the third party when performing the due diligence process including, by non-limiting example, questionnaires, background checks, credit report verification, personal interviews, group interviews, discussions with legal authorities, private investigations, seeking public comment/feedback, and other methods of verifying/obtaining information on the prospective user of the system. Also, a wide variety of standards may be employed by the third party in conducting the due diligence which may vary according to the particular industry the prospective user of the system is in and/or which other users of the system that the prospective user seeks to communicate with over the private network. These standards include standards and regulations promulgated by, by non-limiting example, the National Institute of Standards (NIST) SP-800, guidelines from the Securities Exchange Commission (SEC), the BD/IA Cyber Consortium, the Financial Industry Regulatory Authority (FINRA), the Consumer Financial Protection Bureau (CFPB), the International Organization for Standardization (ISO) standards, Health Insurance Portability and Accountability Act (HIPPA) regulations, legal standards, professional standards, and any other guidelines and/or standards promulgated by an industry association, regulatory body, and/or governmental body.

A non-limiting example of a set of standards that may be employed by a third party to measure the compliance of a potential user of the system can include any of the following: governance and risk assessments, device management, access rights and controls, encryption and data loss prevention, vulnerability assessments, scans and penetration testing, auditing, reporting and logging, application development and security, and cybersecurity insurance. It can also include vendor management practices such as training and monitoring, cloud management and security, business continuity and disaster recovery, management of the physical work environment, incident detection and response procedures, and communications with regulatory organizations.

Governance and risk assessments may be implemented by periodic cybersecurity risk assessments. These assessments may be tailored to identified risks. Device management may be implemented by monitoring or collecting device data from mobile and desktop devices, or any other device that can connect to the network. Access rights and controls can be implemented by administering password security standards, such as prohibiting the use of the same password for multiple systems, and controlling administration level access, such as multi-factor authentication, preventing unauthorized escalation of privileges, and monitoring each administrative level session. Encryption and data loss prevention can be implemented by segregating protected data and complying with best practices to secure electronic storage of data, and any archives of data. Vulnerability assessments, scans and penetration testing can be implemented by periodic assessment or test of the system, which can be done by mimicking an attack on the system manually or by automation. Auditing, reporting and logging can be implemented by tracking cybersecurity events, and ensuring that the system can be reconstructed during an event to support normal operations. Application development and security can be implemented by maintaining guidelines for the development of new applications and systems to ensure the development process complies with security standards, and evaluating such new applications to further ensure that they comply with these standards. Cybersecurity insurance can be implemented by obtaining a policy for recovery or relief from cybersecurity incidents, which can be monetary or technology based.

Through the use of a third party to both perform the due diligence and to control all user's access to the system and their ability to communicate with each other using their computing devices across the private network, a trusted network is created on which all the users are free to exchange all information needed to conduct their business and transactions securely and confidentially. Without the due diligence process, each user may still be required to perform its own due diligence on each other user of the system using varying standards selected by each user. This causes various service providers to be potentially subject to multiple audits/due diligence processes from multiple clients. The time and expense involved in dealing with these multiple processes both for the vendors and the clients results in clients and vendors either avoiding doing the due diligence, or results in clients and vendors having widely varying compliance with industry standards. Using a single third party to do all due diligence to the same set of standards permits each user of the private network to have to go through the process once and allows them all to be able to trust each other user on the network, knowing that they have also been vetted to the same standards. This may save considerable time and expense for all the users collectively (and individually).

In the various system and method implementations disclosed herein, the presence of the combination of all three aspects simultaneously produces a synergistic effect that results in greater security for any user of the system and the data than if each aspect was employed individually (or if only any two of the three were combined). Accordingly, the use of a third party due diligence process in combination with a private, dispersive network with secured endpoint devices has the effect of creating a secured, trusted place where users can share information with each other. Because the network is supervised by the third party, compliance with standards is enforced, but since the third party is not any one of the users, but may be a public benefit corporation in particular implementations, the third party cannot be influenced by any one of the users (or potential users) to change the standards just for that party. Also, because the third party is a private company rather than a publicly traded company and is dedicated to a public purpose, shareholders have no ability to influence its standards or policies to increase profits. Finally, when a private public benefit corporation rather than a governmental agency is used, companies and individuals from multiple countries are free to use the private network without dealing with issues of citizenship or concerns that the host country is engaged in covert surveillance of the data being exchanged.

Figure 1:
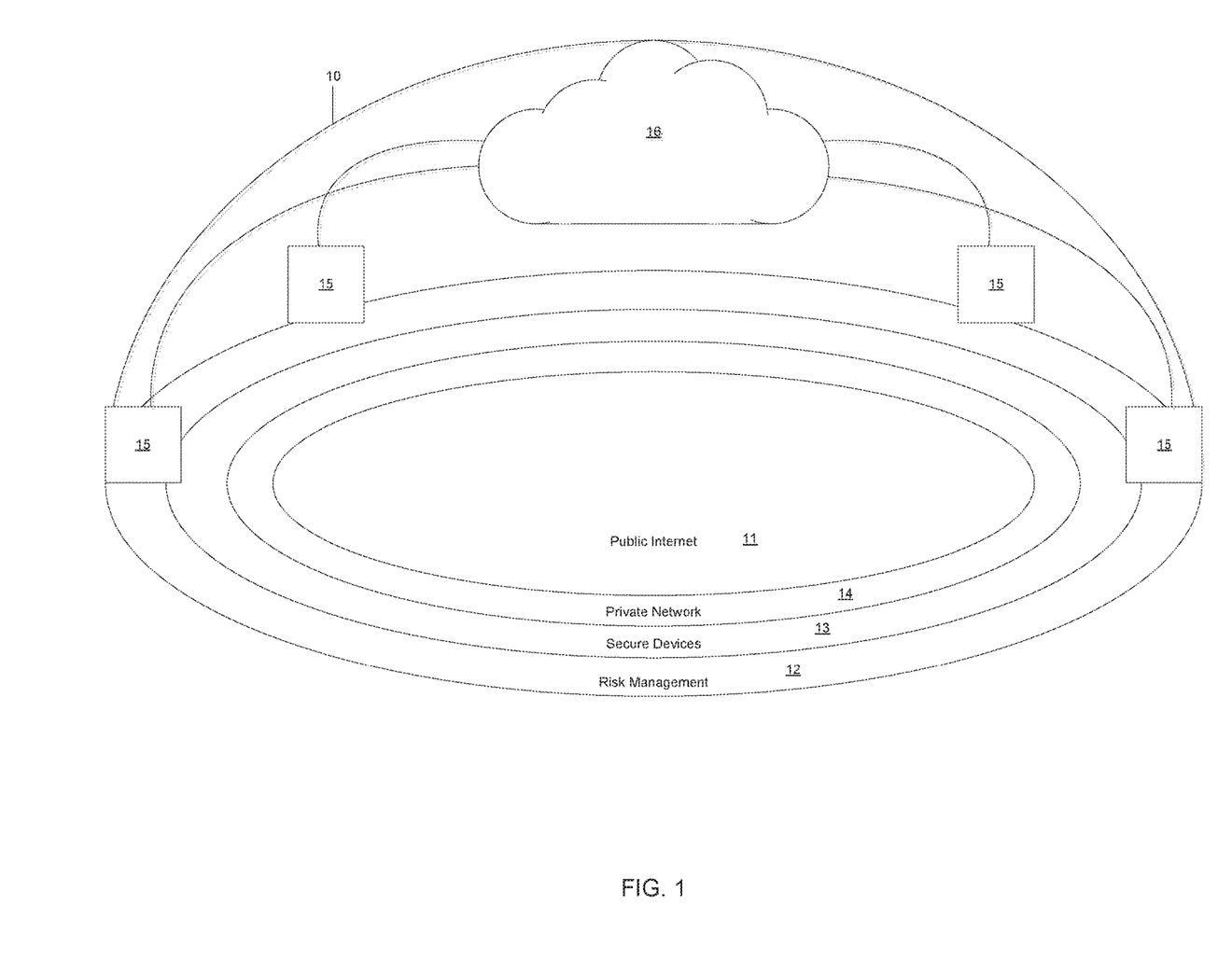
FIG. 1 illustrates an implementation of a software-defined network perimeter system.

Referring to FIG. 1, an example system of a software-defined network perimeter is illustrated. As illustrated, a trusted dispersive network 10, or software-defined network perimeter, overlays the public internet 11. Three example components of the trusted network 10 are also depicted. These components may include, by non-limiting example, risk management 12, secure devices 13 that have been vetted and have met the requirements of the predefined security standards, and a private network 14 which consists of these secure devices 13, which are administered as part of the dispersive network 10.

In various implementations of the software-defined network perimeter 10, each of the network constituents 15 does not have access to confidential data about one another, such as private IP addresses and network infrastructure or architecture. Instead, a cyber cooperative 16, or Co-Op, is established to execute the administrative process of the private network 10. The Co-Op 16, the software-defined network perimeter 10, predefined security standards, and end point protections results in a perimeter of defenses that allow multiple organizations across an industry (and/or industries) to achieve collective security. For example, ensuring secure endpoint devices assists in preventing a compromised device from introducing vulnerabilities to the collective private network constituents 15.

Figure 2:
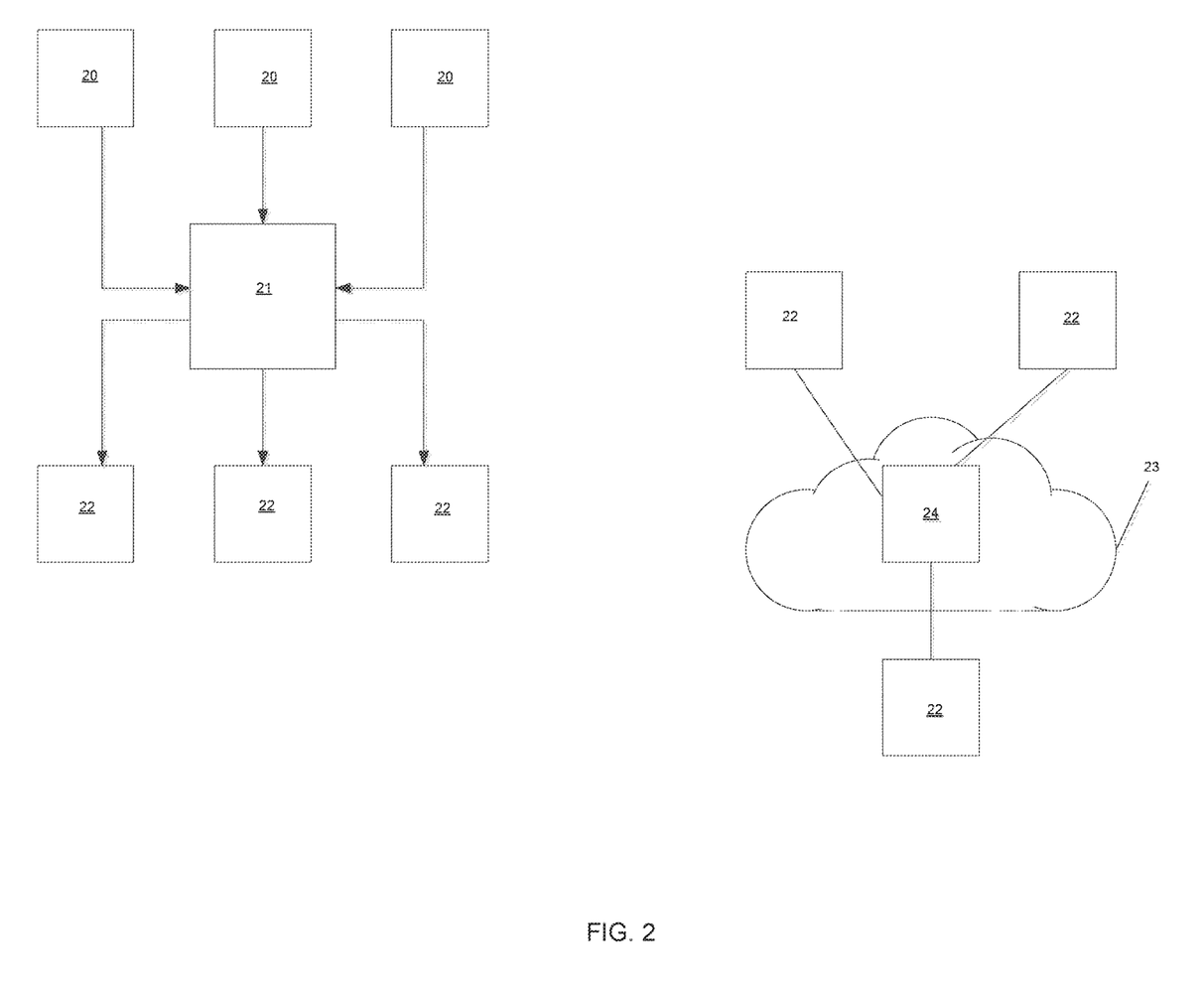
FIG. 2 an implementation of a system of vetting a plurality of endpoint devices and a dispersive network.

Referring to FIG. 2, an example system of vetting a plurality of endpoint devices and a dispersive network is illustrated. As illustrated, a group of endpoint devices 20 pass through a set of due diligence steps, according to predefined security standards as administrated by a correlation server 21, and are then regarded as secured endpoint devices 22. These secured endpoint devices 22 can then communicate with each other across the network 23, or may access allowed network resources 24.

Figure 3:
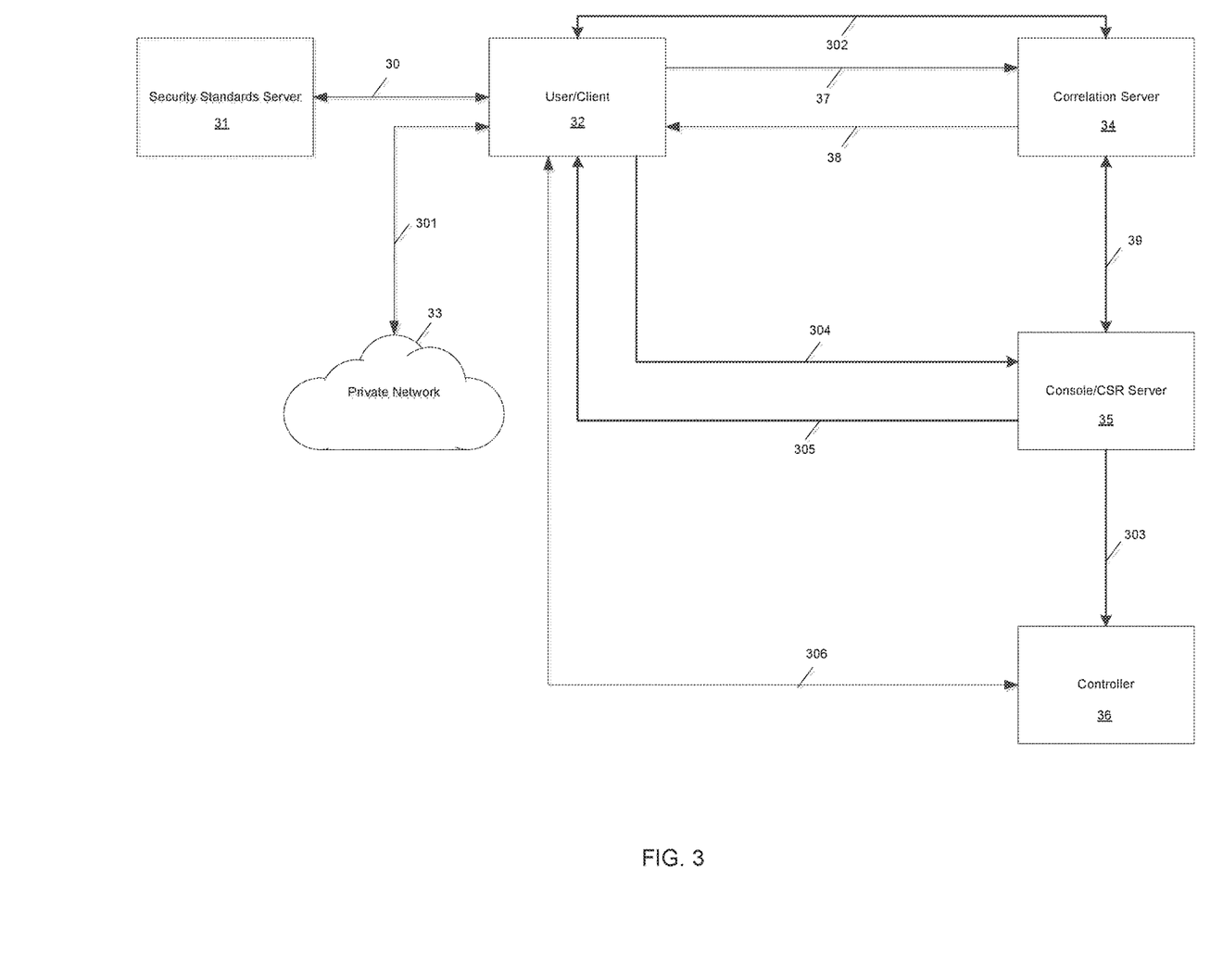
FIG. 3 is a block diagram of an implementation of a software-defined network perimeter system.

Referring to FIG. 3, an example block diagram of a software-defined network perimeter is illustrated. As illustrated, the User/Client computing device 32 that desires to connect to the private network 33 must first have the software application that enforces the predefined computing security standards downloaded across telecommunication channel 30 and installed, and the software must be operating. After verification that the User/Client 32 computing device is compliant, the computing device 32 either makes a call 37 to a correlation server 34 or receives a contact 38 from the correlation server 34. The correlation server 34 takes the data received from the User/Client computing device 32 and uses it to verify the identity of the device 32 and validate across the telecommunication channel 302 one or more registration keys provided by the User/Client computing device 32. The correlation server 34 uses the device identity and the one or more registration keys to determine whether the User/Client computing device 32 is permitted to access across telecommunication channel 301 the private network 33. In various implementations, the correlation server 34 also determines which other User/Client computing devices and/or users already connected to the private network 33 can interact with the newly validated User/Client computing device 32. This process of validating across the telecommunication channel 302 User/Client computing devices and determining which resources on the private network 33 those devices can interact with can be referred as the process of "provisioning" each of the User/Client computing devices so they can operate on the private network 33.

Once the User/Client computing device's 32 identity is verified/confirmed, its ability to access across telecommunication channel 301 the private network 33 is determined by correlation server 34. The correlation server 34 also determines which already connected computing devices and/or users the computing device 32 can interact with are determined. To do this, the correlation server 34 synchronizes 39 this information (and other information needed by the private network 33 about the User/Client computing device 32) with a console CSR server 35 and/or a controller 36. The User/Client computing device 32 is registered across telecommunication channel 303 using the controller 36. The console CSR server 35 and/or the controller 36 are the portions of the system that operate the private network 33 itself and handle the dispersive routing of data between the computing devices connected to the private network 33. The console CSR server 35 and/or the controller 36 rely on the correlation server 34 to handle the identification, validation, and provisioning of the User/Client devices on the private network 33; they do not perform these functions themselves, but work to maintain the operation of the private network 33 between the various devices. For example, the console CSR server 35 may receive 304 the registration key from the User/Client computing device 32 and then allow 305 access to network services, and the controller may connect 306 the User/Client 32 to the private network 33.

Figure 4:
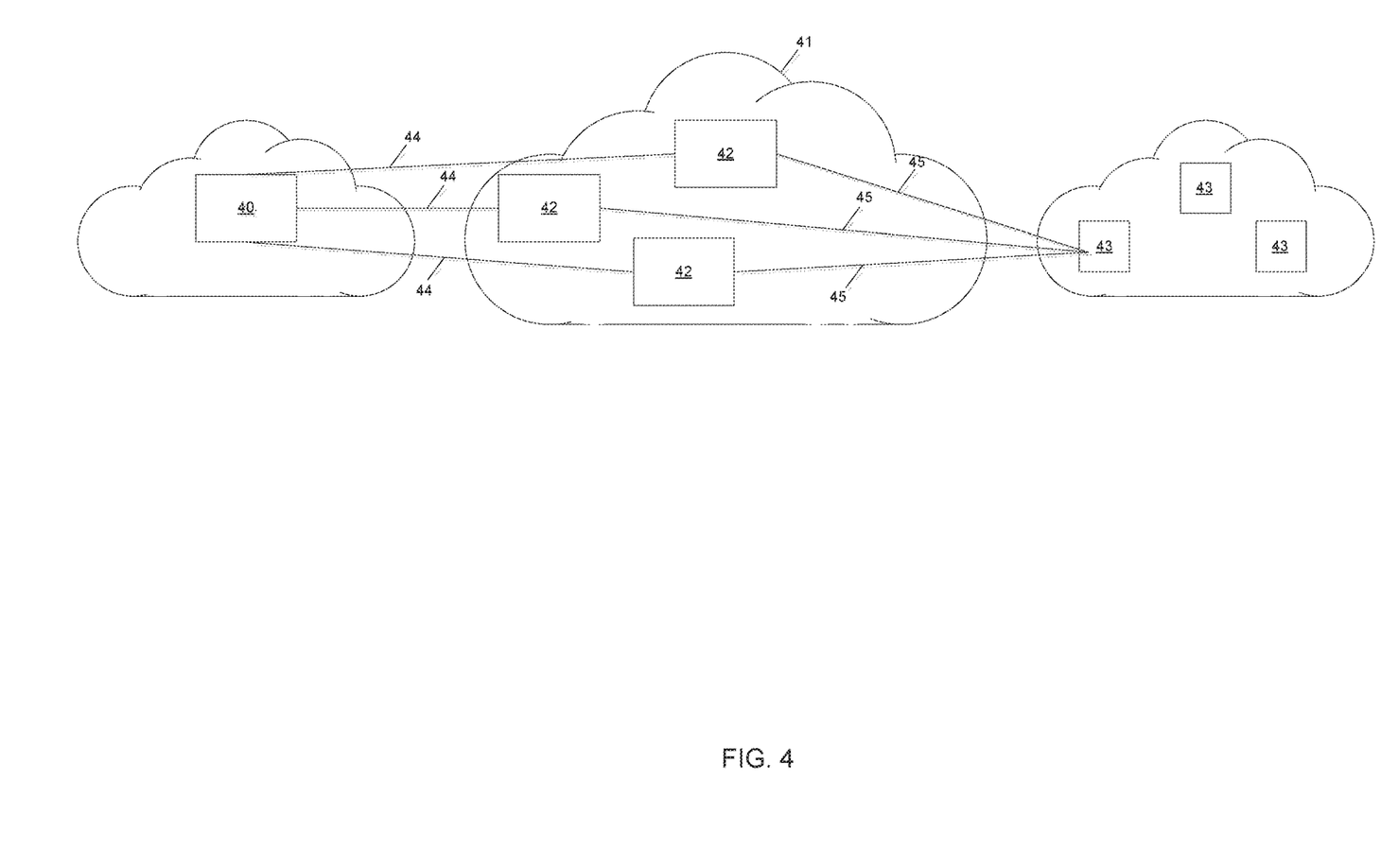
FIG. 4 illustrates an implementation of a dispersive network.

Referring to FIG. 4, an implementation of a system of a dispersive network is illustrated. As illustrated, a secured endpoint device equipped with a virtual thin client 40 transmits a network communication through a network overlay 41. This communication is dispersed over multiple relays 42 or waypoints and is then combined or recombined as it reaches its destination 43.

Implementations of a dispersive network 41 may include, by non-limiting example, the installation of a virtual thin client 40 on a client device. This software then intercepts network packets of data and splits it into multiple streams of data 44, where each stream of data 44 is sent on an independent and different path 45 through the network overlay 41 to reach its final destination 43. Implementations of a dispersive network may also include multiple paths of network travel for one network packet, packet arrival at its destination in a manner that is out of order, and eventual recombination of the packet of data at its destination.

Figure 5:
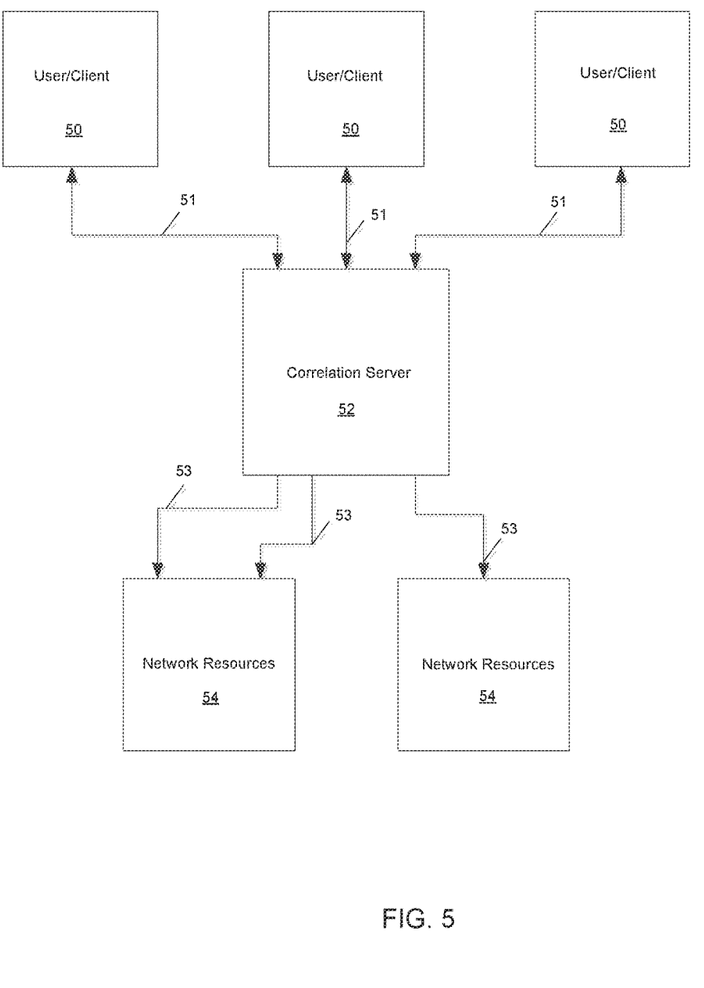
FIG. 5 illustrates an implementation of a software-defined network perimeter system being administered by a correlation server.

Referring to FIG. 5, an example system of a software-defined network perimeter as administered by a correlation server is illustrated. As illustrated, a user/client device 50 is configured to communicate with the correlation server 52. The correlation server 52 is configured to match 51 physical aspects or logical aspects of each user/client machine 50 to a registration key. After the registration key is received and verified, the user/client machine is permitted 53 to access network resources 54, as illustrated.

Figure 6:
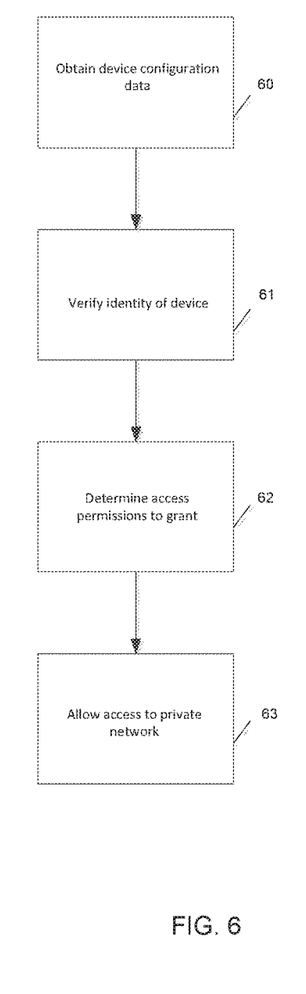
FIG. 6 illustrates a flow diagram of an implementation of a method of onboarding a client machine to a trusted network.

Referring to FIG. 6, an example flow diagram of onboarding a client machine to a trusted network is illustrated. As illustrated, the configuration data of a client device or machine is obtained (step 60). Next, the identity of the device is verified (step 61). Next, it is determined what access permissions should be granted to the client device (step 62). Finally, the client device is allowed or permitted access to the private network (step 63).

Figure 7:
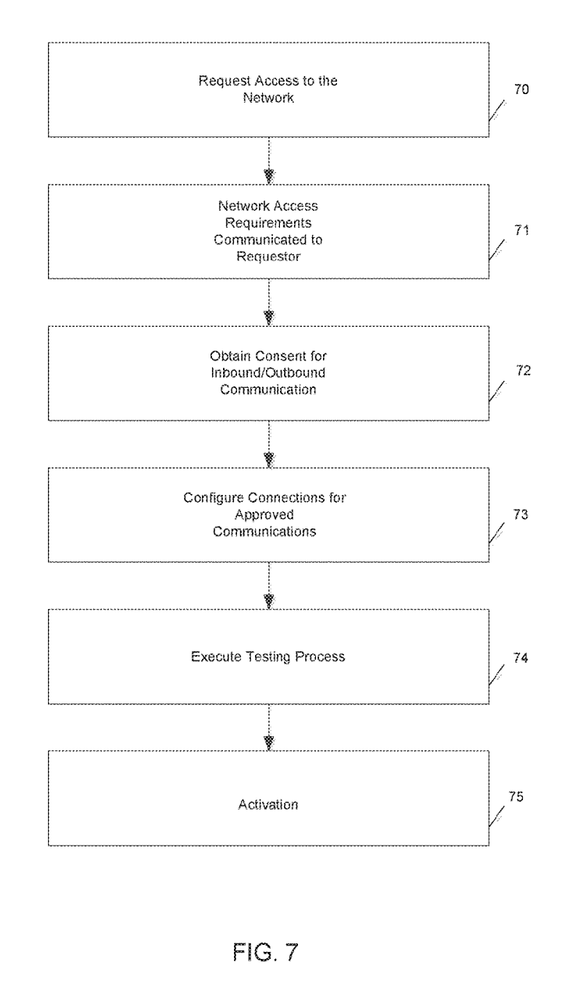
FIG. 7 is a flow diagram of an implementation of a method of vetting a client machine and allowing access to network resources.

Referring to FIG. 7, a flow diagram of an implementation of a method of vetting a client machine and allowing access to network resources is illustrated. As illustrated, a client device first requests access to the network (step 70). Next, the requirements for network access are communicated to the requestor or client device (step 71). Next, the client device obtains consent for transmitting and receiving inbound and outbound communication (step 72). Next, the client device is configured to connect via approved network communications (step 73). Next, the client device undergoes a testing process until, by non-limiting example, the device meets the predefined security standards (step 74). Finally, the client device is activated, or allowed access to the private network of network resources (step 75).

Various implementations of vetting a client machine and allowing access to network resources may include requesting access to network resources from the Co-Op by various methods, including digital form submission that may use, by non-limiting example, software to verify the identity of the requestor. Implementations of the method may also include communication sent by the Co-Op to the requestor which may outline the requirements for being added to the trusted network, which may include, by non-limiting example, software that will need to be downloaded to facilitate the configuration of computing devices for the private network, information about IPs and ports to facilitate communication over the private network, and a pre-implementation checklist which may outline the security measures taken by the requestor or the predefined security standards required by the Co-Op. Implementations of the method may also include approval or denial of a request to be allowed access to the private network from the Co-Op. Implementations of the method also include executing private IP communications, assigning a date to enable private network communications with the approved computing device, and performing testing, wherein a successful test will result in the device being allowed access to the private network, and will enable a new connection via the private network. Implementations of vetting a client machine and allowing access to network resources may also include testing the new connection using a website, software, or other process, where the user of the new device is able to see the result of the testing, by non-limiting example. Implementations of vetting a client machine and allowing access to network resources may also include activation of the device on the private network.

An implementation of a potential user application form may include various questions from the potential user regarding what other users they want to communicate with over the network. The application form may include additional questions, such as, by non-limiting example, questions for the requestor regarding organization type, party in charge of information technology in the organization or network set-up, party responsible for testing network communication security, desired testing date or dates, desired activation date for activation or onboarding to the private network, parties with which the requestor would like to send and receive transmissions, parties with which the requestor would like to share computing or software applications, list(s) of IP and port addresses used by the organization, lists of the operating systems used in the requestors applications, lists of device types that will be accessing the private network, and/or network diagrams associated with the requestors applications. Any of these standards, method implementations, and application forms may be used in various system and method implementations disclosed herein.

Figure 8:
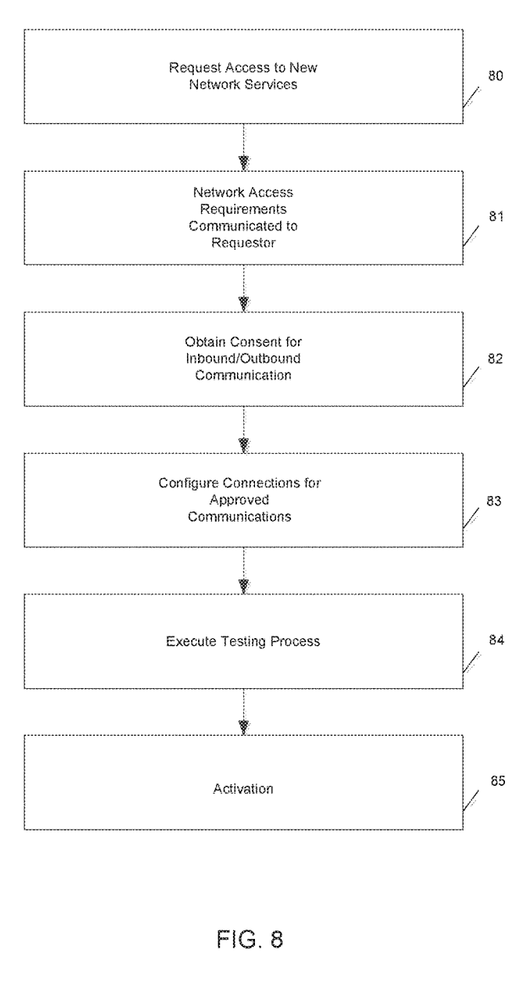
FIG. 8 is a flow diagram of an implementation of a method of vetting a client machine and allowing access to new or different network resources.

Referring to FIG. 8, an example flow diagram of vetting a client machine and allowing access to new or different network resources is illustrated. As illustrated, a client device requests new access to the network (step 80), or new network permissions. Next, the requirements for network access are communicated to the requestor or client device (step 81). Next, the client device obtains consent for transmitting and receiving inbound and outbound communication (step 82). Next, the client device is configured to connect via approved network communications (step 83). Next, the client devices undergoes a testing process until, by non-limiting example, the device meets the predefined security standards (step 84). Finally, the client device is activated, or allowed access to the private network of network resources (step 85).

In places where the description above refers to particular implementations of software defined network for creating a trusted network systems and related methods and implementing components, sub-components, methods and sub-methods, it should be readily apparent that a number of modifications may be made without departing from the spirit thereof and that these implementations, implementing components, sub-components, methods and sub-methods may be applied to other software defined networks for creating trusted network systems and related methods.

What is claimed is:

1. A software-defined network perimeter system, comprising:
   a security standards server, the security standards server configured to send an installer to a first client machine utilizing an endpoint protection server;
   a console server configured to route data across a dispersive network, wherein data is routed between the first client machine and a second client machine;
   a controller configured to electronically couple the first client machine and a second client machine to a plurality of network resources;
   a first endpoint device coupled to the first client machine;
   a second endpoint device coupled to the second client machine; and
   a correlation server coupled to the security standards server, the console server, the controller, the first endpoint device, and the second endpoint device wherein the correlation server is configured to match at least one physical aspect or at least one logical aspect of the first client machine to a first registration key of a database of registration keys and match at least one physical aspect or at least one logical aspect of the second client machine to a second registration key of the database of registration keys;
   wherein the first endpoint device provides access to the plurality of network resources after receiving the first registration key;
   wherein the second endpoint device provides access to the plurality of network resources after receiving the second registration key; and
   wherein the dispersive network includes multiple dynamically changing network paths that have data transmitted between the first client machine and the second client machine.

2. The system of claim 1, wherein the dispersive network is configured to couple to a third client machine and the first endpoint device is configured to deny access to the third client machine from the first client machine in response to the correlation server indicating the third client machine is not a permitted network resource for the first client machine.

3. The system of claim 1, wherein the correlation server is further configured to synchronize a plurality of network resource access permissions with the console server.

4. The system of claim 1, wherein the first endpoint device and the second endpoint device are secured according to a plurality of predefined security standards.

5. The system of claim 1, wherein the correlation server, the first endpoint device, and the second endpoint device are further configured to utilize two-factor authentication.

6. The system of claim 1, wherein the first registration key and the second registration key are transmitted by electronic mail, respectively, to a user of the first client machine and to a user of the second client machine.

7. The system of claim 1, wherein the first registration key and the second registration key are transmitted by simple message service, respectively, to a user of the first client machine and to a user of the second client machine.

8. A software-defined network perimeter system comprising:
   a plurality of secure endpoint devices, wherein each user of each of the plurality of secure endpoint devices has been vetted to a plurality of predefined security standards;
   a console server coupled with each of the plurality of secure endpoint devices, wherein the console server is configured to route data across a dispersive network between the plurality of secure endpoint devices;
   a correlation server coupled with the console server and configured to determine which one of the plurality of secure endpoint devices receives data from each other one of the plurality of secure endpoint devices across the dispersive network;
   a security standards server coupled with the correlation server, the security standards server configured to send an installer to a first secure endpoint device utilizing an endpoint protection server, the first secure endpoint device configured to transmit the installer to a first client device; and
   a controller coupled with the correlation server, the controller configured to electronically couple the first secure endpoint device and a second secure endpoint device, from among the plurality of secure endpoint devices, with a plurality of network resources;
   wherein each of the plurality of secure endpoint devices are coupled to each of a plurality of client machines, respectively, and each of the plurality of secure endpoint devices is configured to provide access to the plurality of network resources to a respective client machine of the plurality of client machines in response to receiving a registration key from the correlation server; and
   wherein the dispersive network includes multiple dynamically changing network paths that have data transmitted between the plurality of secure endpoint devices.

9. The system of claim 8, wherein the plurality of predefined security standards comprises an encryption standard.

10. The system of claim 8, wherein the plurality of predefined security standards comprises a plurality of device vulnerability tests.

11. The system of claim 8, wherein the plurality of predefined security standards comprises a security auditing standard.

12. The system of claim 8, wherein the console server is further configured to divide data transmitted over a network into a plurality of component transmissions, wherein each of the plurality of component transmissions is transmitted over independent paths over the dispersive network.

13. The system of claim 8, wherein the console server is further configured to randomize a plurality of data transmission paths over the dispersive network.

14. A method of using a software-defined network perimeter system to establish a trusted network, the method comprising:
   vetting a first client machine according to a plurality of predefined security standards;
   onboarding the first client machine to the trusted network through an endpoint device coupled to the first client machine after the first client machine has met requirements of the plurality of predefined security standards;
   permitting the first client machine to electronically communicate with a second client machine across a dispersive network using a correlation server;

dispersing network traffic across the dispersive network using a console server;

sending at least one physical aspect or at least one logical aspect of the first client machine to the correlation server where the correlation server matches the at least one physical aspect or the at least one logical aspect of the first client machine with a registration key using a database of registration keys; and transmitting a matched registration key from the correlation server to the endpoint device;

wherein the dispersive network includes multiple dynamically changing network paths that have data transmitted between the first client machine and the second client machine;

wherein the second client machine has been vetted according to the plurality of predefined security standards; and wherein the second client machine has been indicated by the correlation server to be allowed to communicate with the first client machine.

15. The method of claim 14, further comprising installing one or more executable files on the first client machine using an endpoint server.

* * * * *